United States Patent
Kresge et al.

(10) Patent No.: US 12,505,705 B2
(45) Date of Patent: Dec. 23, 2025

(54) TERRAIN CLASSIFICATION AND SYSTEM HEALTH MONITORING

(71) Applicant: Battelle Memorial Institute, Columbus, OH (US)

(72) Inventors: Keith F. Kresge, Columbus, OH (US); Robert D. Ward, Fairfax, VA (US); Jonathan Coyle, Dublin, OH (US)

(73) Assignee: Battelle Memorial Institute, Columbus, OH (US)

( * ) Notice: Subject to any disclaimer, the term of this patent is extended or adjusted under 35 U.S.C. 154(b) by 319 days.

(21) Appl. No.: 17/730,486

(22) Filed: Apr. 27, 2022

(65) Prior Publication Data

US 2022/0343701 A1    Oct. 27, 2022

Related U.S. Application Data

(60) Provisional application No. 63/180,586, filed on Apr. 27, 2021.

(51) Int. Cl.
| | |
|---|---|
| G05D 1/86 | (2024.01) |
| G07C 5/00 | (2006.01) |
| G07C 5/02 | (2006.01) |

(52) U.S. Cl.
CPC ............... G07C 5/02 (2013.01); G05D 1/86 (2024.01); G07C 5/008 (2013.01); *B60G 2400/82* (2013.01); *B60Y 2306/15* (2013.01)

(58) Field of Classification Search
CPC .. G05D 1/86; B60G 2400/82; B60Y 2306/15; B60W 2422/10; B60W 40/06; B60W 50/04; G05B 23/024

(Continued)

(56) References Cited

U.S. PATENT DOCUMENTS

| | | | |
|---|---|---|---|
| 2015/0088361 A1* | 3/2015 | Hartl | B60L 3/0046 701/29.2 |
| 2017/0092021 A1* | 3/2017 | Nielsen | G07C 5/0808 |

(Continued)

FOREIGN PATENT DOCUMENTS

| | | | | |
|---|---|---|---|---|
| DE | 102018203071 A1 | * | 9/2019 | |
| GB | 2534884 A | * | 8/2016 | B60W 50/14 |

OTHER PUBLICATIONS

Ranasinghe K, Kapoor R, Gardi A, Sabatini R, Wickramanayake V, Ludovici D. Vehicular Sensor Network and Data Analytics for a Health and Usage Management System. Sensors (Basel). Oct. 17, 2020;20(20):5892. doi: 10.3390/s20205892. PMID: 33080921; PMCID: PMC7589191. (Year: 2020).*

(Continued)

*Primary Examiner* — Tiffany P Young
*Assistant Examiner* — Leah N Miller
(74) *Attorney, Agent, or Firm* — Grossman, Tucker, Perreault & Pfleger, PLLC; Edmund P. Pfleger

(57) ABSTRACT

The present disclosure provides a system for terrain classification and vehicle suspension sub-system health status indication. The system includes run-time terrain classification circuitry to determine a first terrain classification, for a vehicle travelling on a terrain segment, based on comparing a trained model to suspension sub-system sensor data and vehicle speed data; model accuracy determination circuitry to determine a second terrain classification, for the vehicle travelling on the terrain segment, based on the suspension sub-system sensor data and vehicle speed data and independent of the trained model; and sub-system health determination circuitry to determine a health indication of the suspension sub-system by comparing a difference between the first and second terrain classifications to at least one health threshold.

14 Claims, 5 Drawing Sheets

(58) Field of Classification Search
USPC .............................................. 701/31.9, 29.1
See application file for complete search history.

(56) References Cited

U.S. PATENT DOCUMENTS

| 2019/0025160 | A1* | 1/2019 | Marble | ................. | G01M 17/04 |
| 2019/0353561 | A1* | 11/2019 | Landolsi | ............ | B60G 17/0195 |
| 2022/0198842 | A1* | 6/2022 | Agarwal | .............. | G07C 5/0808 |

OTHER PUBLICATIONS

S. Wang, S. Kodagoda, L. Shi and H. Wang, "Road-Terrain Classification for Land Vehicles: Employing an Acceleration-Based Approach," in IEEE Vehicular Technology Magazine, vol. 12, No. 3, pp. 34-41, Sep. 2017, doi: 10.1109/MVT.2017.2656949. (Year: 2017).*

E. Rabeno and M. Bounds, "Condition based maintenance of military ground vehicles," 2009 IEEE Aerospace conference, Big Sky, MT, USA, 2009, pp. 1-6, doi: 10.1109/AERO.2009.4839683. (Year: 2009).*

Bock FE, Keller S, Huber N, Klusemann B. Hybrid Modelling by Machine Learning Corrections of Analytical Model Predictions towards High-Fidelity Simulation Solutions. Materials (Basel). Apr. 10, 2021;14(8):1883. doi: 10.3390/ma14081883. PMID: 33920078; PMCID: PMC8069582. (Year: 2021).*

L. Liao and F. Köttig, "Review of Hybrid Prognostics Approaches for Remaining Useful Life Prediction of Engineered Systems, and an Application to Battery Life Prediction," in IEEE Transactions on Reliability, vol. 63, No. 1, pp. 191-207, Mar. 2014, doi: 10.1109/TR.2014.2299152. (Year: 2014).*

Jacobsen, C., Zscherpel, U., Perner, P. A Comparison between Neural Networks and Decision Trees. In: Perner, P., Petrou, M. (eds) Machine Learning and Data Mining in Pattern Recognition. MLDM 1999. Lecture Notes in Computer Science, vol. 1715. Springer, Berlin, Heidelberg. (Year: 1999).*

F.-Y. Tzeng and K.-L. Ma, "Opening the black box - data driven visualization of neural networks," VIS 05. IEEE Visualization, 2005., Minneapolis, MN, USA, 2005, pp. 383-390, doi: 10.1109/VISUAL.2005.1532820. (Year: 2005).*

U.S. Army Yuma Proving Ground & Automotive Directorate, Test Operations Procedure (TOP) & 01-1-010A Vehicle Test Course Severity (Surface Roughness), Accession No. AD1043586, Dec. 12, 2017, 87 pages.

* cited by examiner

TERRAIN CLASSIFICATION AND SYSTEM HEALTH MONITORING

This application claims the benefit of U.S. Provisional Application Ser. No. 63/180,586, filed Apr. 27, 2021, which is hereby incorporated by reference in its entirety.

STATEMENT REGARDING FEDERALLY SPONSORED RESEARCH OR DEVELOPMENT

This invention was made with government support under H9240320F0028 (USSOCOM) and H9240318F0039 (USSOCOM) awarded by the Department of Defense, and FA8075-14-D-0015, CON00026370 100101155-RCVPH2ENGC awarded by US Army Contracting. The government has certain rights in the invention.

TECHNICAL FIELD

The present disclosure relates to terrain classification and system health monitoring for a vehicle.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

Figure 1:
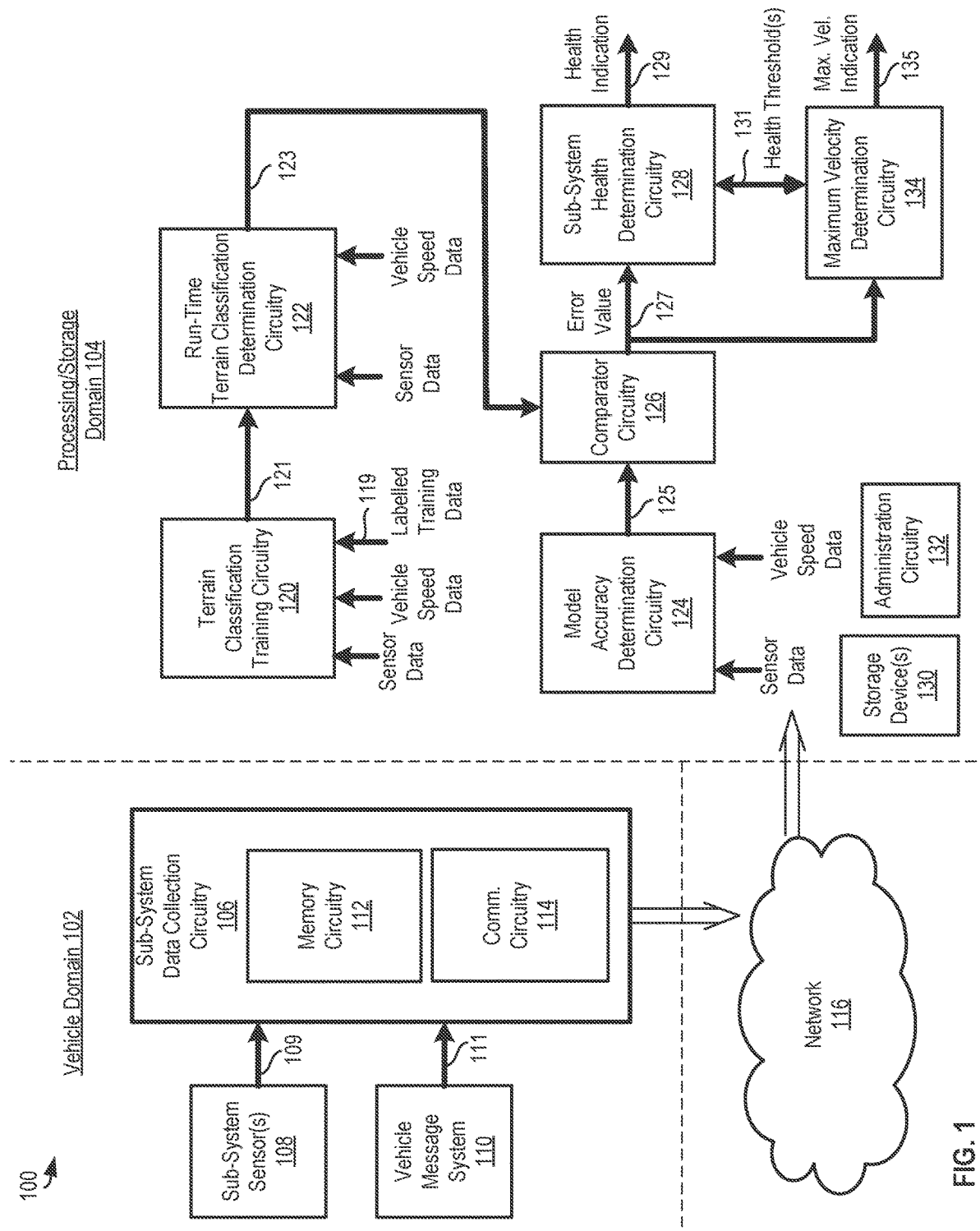
FIG. 1 illustrates a terrain classification and system health monitoring system in accordance with several embodiments of the present disclosure.

FIG. 1 illustrates a terrain classification and system health monitoring system 100 in accordance with several embodiments of the present disclosure. As a general overview, the terrain classification and system health monitoring system 100 provides a mechanism to predict a health metric of one or more vehicle sub-systems based on vehicle operations and prediction models to enable accurate determination of service requirements and/or replacement of the vehicle sub-system. By way of example, a vehicle sub-system may include a vehicle suspension system that includes, for example, leaf springs, shocks/struts, control arm components, and/or other components commonly associated with a vehicle suspension system, etc., each of which may be monitored to provide wear indications, which are used to predict when the suspension system may require service and/or replacement. The terrain classification and system health monitoring system 100 generally includes a vehicle domain 102 and a processing/storage domain 104. The vehicle domain 102 represent a portion of a subject vehicle, and is generally configured to gather pertinent data concerning a vehicle sub-system of interest, for example, the suspension system of a vehicle. The vehicle domain 102 includes sub-system data collection circuitry 106 generally configured to control one or more sensors, receive and store sensor data and/or other vehicle data (as described below), and communicate with the processing/storage domain 104 (as described below).

The vehicle domain 102 may include one or more sub-system sensors 108 generally configured to sense relevant and/or pertinent information concerning all or part of a vehicle subsystem. In one example embodiment in the context of a suspension subsystem, the sub-system sensors 108 may include at least one accelerometer (e.g., x, y and/or z-direction accelerometers), and/or at least one gyroscope, and/or other sensors to generate sensor data 109 indicative of the physical response of a suspension system during travel. For example, accelerometers may be used to determine operating characteristics of a suspension sub-system including, for example, yaw, pitch, roll, acceleration/deceleration in x and/or y directions, transient events such as sudden "hard" hits to suspension components, wheel travel along the z-axis, etc. which collectively and/or individually provide an indication of the type of terrain a vehicle is travelling on.

The vehicle domain 102 may also include a vehicle messaging system 110 generally configured to generate various diagnostic and/or operational data messages 111 concerning the vehicle as a whole and/or concerning one or more sub-systems associated with the vehicle. In some embodiments, the vehicle messaging system 110 may be configured to generate known and/or conventional diagnostic/operational messages using standard vehicle messaging protocols such as controller area network (CAN) messages, J1939 messages, 125 kB messages, etc. Such messages may include, for example, vehicle speed data, odometer data, throttle data, braking data, engine RPM data, wheel speed data, etc.

The sub-system data collection circuitry 106 includes memory circuitry 112 to store sensor data and/or vehicle message data. In some embodiments, the sub-system data collection circuitry 106 may be configured to collect and store data at preset and/or user-definable intervals, for example, every millisecond, every 10 milliseconds, etc. The vehicle controller circuitry 106 also includes communication circuitry 114 to exchange commands and data (including sensor data and/or vehicle message data) with the processing domain 104, via network 116, to enable the processing domain 104 predict terrain profiles and determine vehicle health metrics, as described below. The communications circuitry 114 may comply or be compatible with known and/or conventional and/or custom communications protocols such as cellular communication protocols (e.g., 5G, 3GPP, etc.), WiFi communication protocols, near field communication protocols such as Bluetooth, etc, and/or other communication protocols. In addition, communications circuitry 114 may include encode/decode circuitry (not shown) to provide secure communications using, for example, encryption/decryption protocols, etc.

The processing/storage domain 104 is generally configured to predict or estimate terrain conditions and to determine a health status of one or more vehicle sub-systems. As used herein, "terrain conditions" or "terrain classification" are generally used to quantify the roughness or smoothness of a given terrain or terrain segment. The terrain classification may be labeled using, for example, Department of Defense (DoD) terrain classification labels, including "primary", "secondary", "cross country", etc. Of course, in other embodiments, terrain classification may be labelled using other standardized and/or custom classifications. As used herein, "health status" or "health metric" generally define a value indicative of, or proportional to, a wear/degradation/impairment status of a sub-system or collection of sub-systems. In some embodiments, the health status of a sub-system may be determined as a percent of wear/degradation/impairment relative to a new (unused) sub-system.

In embodiments described herein, predicting or estimating terrain conditions includes generating an initial model for a given vehicle sub-system, and then using the model during run-time operations of the vehicle to determine a terrain classification for a given terrain and/or terrain segment. Accordingly, in the context of the suspension sub-system of a vehicle, the processing/storage domain 104 of the present disclosure includes terrain classification training circuitry 120 generally configured to generate a terrain classification trained model 121 based on sensor data 109, vehicle speed data 111 and labelled training data 119. The labelled training data 119 includes a set of classifications for a variety of known terrains, and represents a "supervised" data set of a plurality of known terrain classifications and corresponding sensor data ranges and vehicle speed ranges.

The terrain classification training circuitry 120 may include pre-processing functions such as a fast Fourier transformation to extract feature data from sensor input and a multi-nodal neural network processing architecture, for example, a multi-layer perception architecture, convolution neural network architecture, etc. In some example embodiments, each input among the sensor data 109, vehicle speed data 111 and labelled training data 119 may be assigned to one or more nodes of the neural network processing architecture, and the model will weigh nodes based on, for example, input data that is selected as being more "important" to the overall results.

To generate the trained model 121, the subject vehicle traverses a plurality of terrains or terrain segments that correspond to the known, classified terrains of the labelled training data 119. The terrain classification training circuitry 120 is configured to map the collection of sensor data 109 and vehicle speed data 111 for a given run to the known terrain classification provided by the labelled training data 119. These operations may be repeated for different run times and different terrains to generate a more accurate the trained model 121. The collection of sensor data 109 and vehicle speed data 111 for a given run represents the response of the suspension system for that run. The sensor data 109 and vehicle speed data 111 may encompass a range of data points for that run. Thus, the trained model 121 represents terrain classifications that are mapped to ranges of sensor data 109 and vehicle speed data 111. In some embodiments, the above-described mapping may occur in a "real-time" manner during each training run using, for example, using additional sensor(s) to measure terrain roughness (such as an inertial terrain profiler, etc.). In other embodiments, during each travel of a terrain or terrain segment, the sensor data 109 and vehicle speed data 111 may be stored (using storage device 130) for the duration of the run, and the above-described mapping operations may take place a preselected and/or user-definable time. In some embodiments, the sensor data 109 and vehicle speed data 111 may be collected and/or stored at predefined intervals (e.g., every millisecond, etc.).

It should be noted that, to provide a more accurate trained model 121, the state of the suspension sub-system may be known, for example, by selecting a subject test vehicle with a new (unused) suspension sub-system. It should also be noted that, for a given terrain, the sensor data 109 and vehicle speed data 111 generally have an inverse relationship. For example, the rougher a given terrain generally operates as a limit to vehicle speed (i.e., the vehicle must go slower), but rougher terrain also generally increases the response of the suspension sub-system (and thus the sensor data 109 produces larger acceleration values compared to smoother terrain).

The increase sensor data over rough terrain may be particularly true for z direction acceleration, and thus, in some embodiments, the model may weigh z-direction acceleration values greater than the z and/or y acceleration values in the multi-nodal neural network architecture described above.

Figure 2:
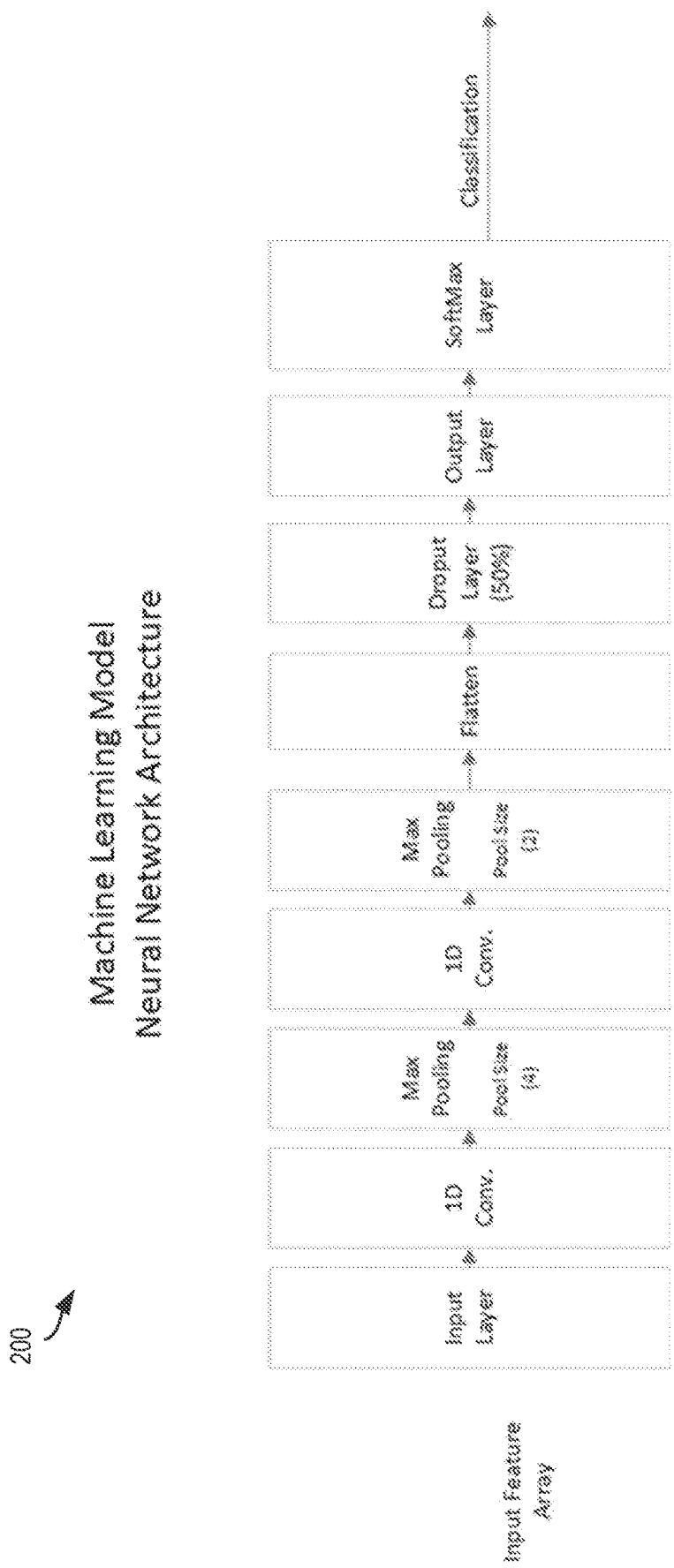
FIG. 2 illustrates a neural network architecture according to one embodiment of the present disclosure.

By way of example, FIG. 2 illustrates a neural network architecture 200 according to one embodiment of the present disclosure. In this example, a 6×100 input feature array represents the output of the feature extraction process, taken in intervals of 1 second (100 measurements) at a time. Each one-dimensional convolution layer of the model architecture has a window size of 6 and a stride length of 24. The max pooling layers calculate the maximum value of features in each pool size, discarding the remainder of the pool. As shown in FIG. 2, the first pool sizes decrease from 4 to 2 in the pooling layers. The final output layer creates a densely connected neural network layer with dimensions that correspond to the number of terrain classes created in the model. The softmax layer normalizes the model output to a probability distribution, where each value represents the probability that the provided measurements for the input feature array correspond to a given class label.

Once the machine learning model has completed training, the model is "frozen". By freezing the model, this ensures that the activation values for the hidden layers remain fixed when the model is presented with additional data. As a result, the frozen model serves as a proxy for the vehicle suspension state at the time that the model was frozen.

The trained model 121 is used for terrain classification during operation of the subject vehicle when traversing over unclassified terrain, as described below. The processing/storage domain 104 of the present disclosure also includes run-time terrain classification determination circuitry 122 generally configured to determine a first terrain classification 123 based on the trained model 121, and sensor data 109 and vehicle speed data 111 received during travel of the subject vehicle on unclassified terrain. As noted above, the model data set includes ranges of sensor data and vehicle speed data for each terrain classification. Accordingly, the terrain classification determination circuitry 122 determines a terrain classification by using the trained model 121 to evaluate the sensor data 109 and/or vehicle speed data 111 to determine a terrain classification that corresponds to the sensor data 109 and/or vehicle speed data 111.

As the suspension sub-system wears over time, the accuracy of the trained model 121 may decline, since the trained model is trained using a known state of the suspension sub-system. (For example, as the suspension system wears, sensor response to a given terrain may increase outside of a first range of expected sensor responses such that the circuitry 122 would now classify a given terrain to be rougher than it actually is). Thus, the first terrain classification 123 may also become less accurate over time. Accordingly, in some embodiments, the present disclosure includes mechanisms to continuously or periodically check the accuracy of the trained model 121. To that end, the processing/storage domain 104 of the present disclosure may also include model accuracy determination circuitry 124 generally configured to determine a second terrain classification 125 that is independent of the trained model 121. In one example embodiment, model accuracy determination circuitry 124 is configured to correlate the sensor data 109 and the vehicle speed data 111 to a second terrain classification 125. In one example, model accuracy determination circuitry 124 may perform correlation using known or after-developed "physics based" computational standards such as the root-mean-square (RMS), International Roughness Index (IRI), etc., which may account for the generally inverse relationship between acceleration values of the sensor data 109 and the vehicle speed data 111, as described above. For example, the model accuracy determination circuitry 124 is configured to determine the IRI by integrating the vertical acceleration from the sensor data 119 once to produce velocity and a second time to produce distance. This vertical distance can be used as a terrain profile input to the quarter-car calculation models for the IRI (as described in ASTM Standard E1926-08 (2021), Standard Practice for Computing International Roughness Index of Roads from Longitudinal Profile Measurements).

By way of example, model accuracy determination circuitry 124 may be configured to determine the second terrain classification 125 using an RMS calculation given by the U.S. Army Test and Evaluation Command Test Procedure (2017), as summarized below:

1. Unit Definition a. G=386.2 in/s"2
b. Low Wavelength=6 in (0.5 feet*12)
c. High Wavelength=786 in (64 feet*12)
Wavelengths are determined by the Army Test Operational Procedures for Surface Roughness which are defined as 0.2 to 20 meters or 0.5 to 64 feet 2. Window Determination For the real time calculation of the RMS value, 2 sets of values recorded from the CAN Protect service messages may be used, for example, a speed data frame and a Z Axis data frame. In addition, a fixed window subset of these values is determined. The size of this window is a passed parameter and is dependent on the frequency of the calculation.

3. ConvertZ Axis Values to Proper Unit Space

The Z Axis values may be presented m/s units, and may also include gravity. In order to accurately calculate the RMS, a gravity vector may be removed from all the Z Axis values, and then divide out gravity in meters per second and multiply in gravity in inches per second.

4. Calculate Average Speed in the Window

Determine the mean of all speed values in the windowed subset, this value will typically be in meters per second and may then be converted to inches per second.

5. Convert Wavelengths to Frequencies

Using the converted average speed, convert the wavelengths to frequencies. A standard sampling rate of 100 may be converted to a sampling interval by taking the inverse:

a. Low Frequency=(AvgSpeed/High Wavelength)/2
b. High Frequency=(AvgSpeed/LowWavelength)/2
c. Sampling Interval=1/Sampling Rate 6. Bring Z Axis Data to the Frequency Domain Perform an FFT to convert Spatial Z Axis data to its corresponding Frequency values.

7. Generate a Second Order Section Bandpass Filter to Filter Z Axis Data

Using the Frequencies defined above, a band pass filter is applied so that only allow values between the defined frequencies are used in the next calculation.

Figure 3:
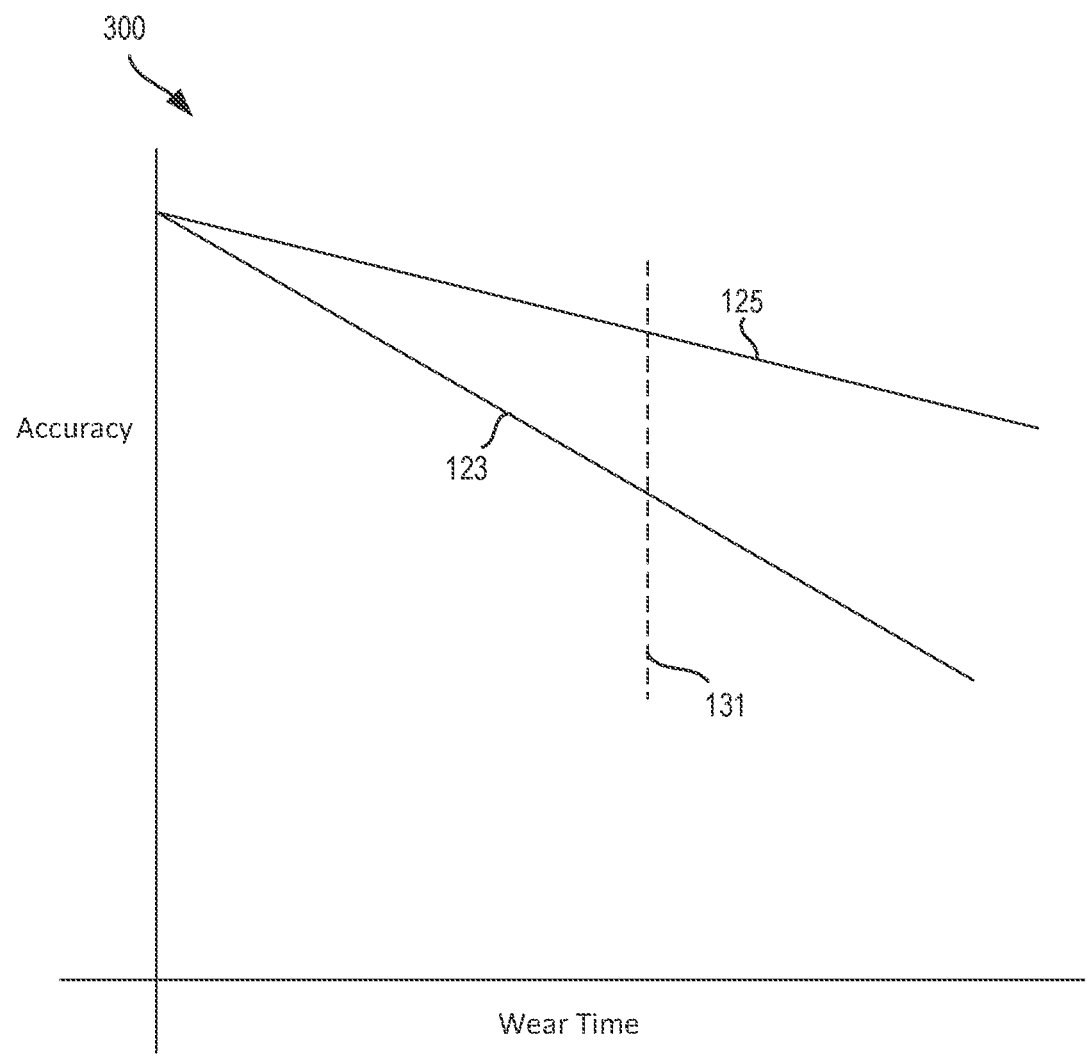
FIG. 3 illustrates a plot of terrain classification accuracy (y-axis) as a function of wear time (x-axis)

It should be noted that the second terrain classification 125 may be generally considered more accurate for a longer period of time than the terrain classification 123 generated as a function of the model 121. This is due to the fact that the model 121 in the training circuitry 120 was frozen to capture the system state at the completion of training. Therefore, the terrain classification 123 generated by circuitry 122 is based on a static correlation of acceleration data and velocity data, as compared to a calculation produced by the terrain classification 125 generated by the accuracy determination circuitry 124 (since although the suspension system degrades over time, sensors remain relatively stable over time, and thus the sensor data 109 and the vehicle speed data 111 remain fairly accurate over time). This concept is illustrated in the plot 300 of FIG. 3. The plot 300 depicts terrain classification accuracy (y-axis) as a function of wear time (x-axis). As illustrated, the accuracy of the terrain classification 123, as predicted based on the trained model, degrades faster than the accuracy of the calculated terrain classification 125. If the delta between terrain classification 123 and terrain classification 125 is greater than threshold 131 (described below), this may indicate that the modelled terrain classification 123 is no longer generating accurate data, and may also indicate sub-system wear has reached the point requiring service.

As described above, the accuracy of the trained model 121, and thus the first terrain classification 123 may correspond to the wear state of the suspension sub-system. Accordingly, the processing/storage domain 104 of the present disclosure may also include comparator circuitry 126 configured to compare the first terrain classification 123 to the second terrain classification 125 to determine an error value 127. Since, as noted above, the second terrain classification 125 remains more accurate than the first terrain classification 123 as the suspension system wears, and increasing error value 127 represents increasing wear of the suspension sub-system. The delta between 123 and 125, as a function of wear time, may be generally derived by observation of how the model determination 123 compares to the calculated determination 125. For example, at selected and/or periodic intervals, the subject vehicle may be "road tested" over a known terrain (similar to the known terrains as the input to the ML model) to determine the values of 123 and 125 and determine the difference between the two values.

The processing/storage domain 104 of the present disclosure may also include sub-system health determination circuitry 128 generally configured to compare the error value 127 to one or more health threshold(s) 131 to determine a health indication value 129. The one or more threshold(s) 131 may include, for example, different action levels that require user attention or intervention (e.g., repair or replace) concerning the suspension sub-system. The threshold(s) 131 are also illustrated in the plot 300 of FIG. 3. For example, the threshold(s) 131 may include a first threshold indicating the start of critical wear of the suspension sub-system, and a second threshold indicating impending failure of the suspension sub-system. If the error value 127 exceeds the first threshold, the health indication value 129 may be generated to indicate that the suspension sub-system will require maintenance in the near future. If the error value exceeds the second threshold, the health indication value 129 may be generated to indicate that the suspension sub-system requires immediate attention.

The processing/storage domain 104 may also include one or more storage devices 130 to store any of the data described herein. The processing/storage domain 104 may also include administration circuitry 132 generally configured to enable a user to control one or more aspects of the system 100, for example, adding and/or modifying labelled training data, controlling input selection to the circuitry described above, setting one or more health threshold(s), etc. It should be noted that the system 100 may be used for any type of system or sub-system associated with a vehicle to make health determinations for that system or sub-system. For example, the teachings of the present disclosure may be modified and applied to a braking sub-system of a vehicle, tire wear, differential systems, electrical systems, power supply systems, etc., and/or other mechanical, electrical or electro-mechanic system or sub-system associated with the subject vehicle. To that end, the health indication 129 may be a sum of health indications of various vehicle system and/or sub-systems.

As can be appreciated, as the error value 127 increases (meaning that the first terrain classification 123 is diverging from the second terrain classification 125) indicating that the sub-system in question is exhibiting signs of increasing wear and/or imminent failure, the overall speed of the vehicle may become impacted. For example, a worn or significantly damaged suspension system may render the vehicle unsafe as speeds increase. Accordingly, in some embodiments, the system 100 may also include maximum velocity determination circuitry 134 generally configured to determine a maximum velocity value 135 based on the error value 127 and the one or more health threshold(s) 131. For example, if the error value 127 exceeds a health threshold 131, the maximum velocity determination circuitry 134 may generate a maximum velocity value 135 that renders the vehicle safe to drive (given the terrain). The maximum velocity value 135 may be an estimation of a safe upper speed limit (based on the health state and error value); where the estimated upper speed limit is derived from historical data (e.g., known upper velocity limits based on given wear conditions) and/or user-definable upper speed limits (e.g., if the wear indication value 129 indicates a 10% wear as compared to a new suspension system, the upper speed limit may be set as 90% of the maximum vehicle speed). In some embodiments, the maximum velocity value 135 may be used to provide an indication to the driver of the vehicle and/or the maximum velocity value 135 may be used as an input for an automated speed control system (e.g., governor). In other embodiments, the maximum velocity value 135 may be used as speed control for unmanned vehicles (e.g., autonomous vehicles, etc.)

Figure 4:
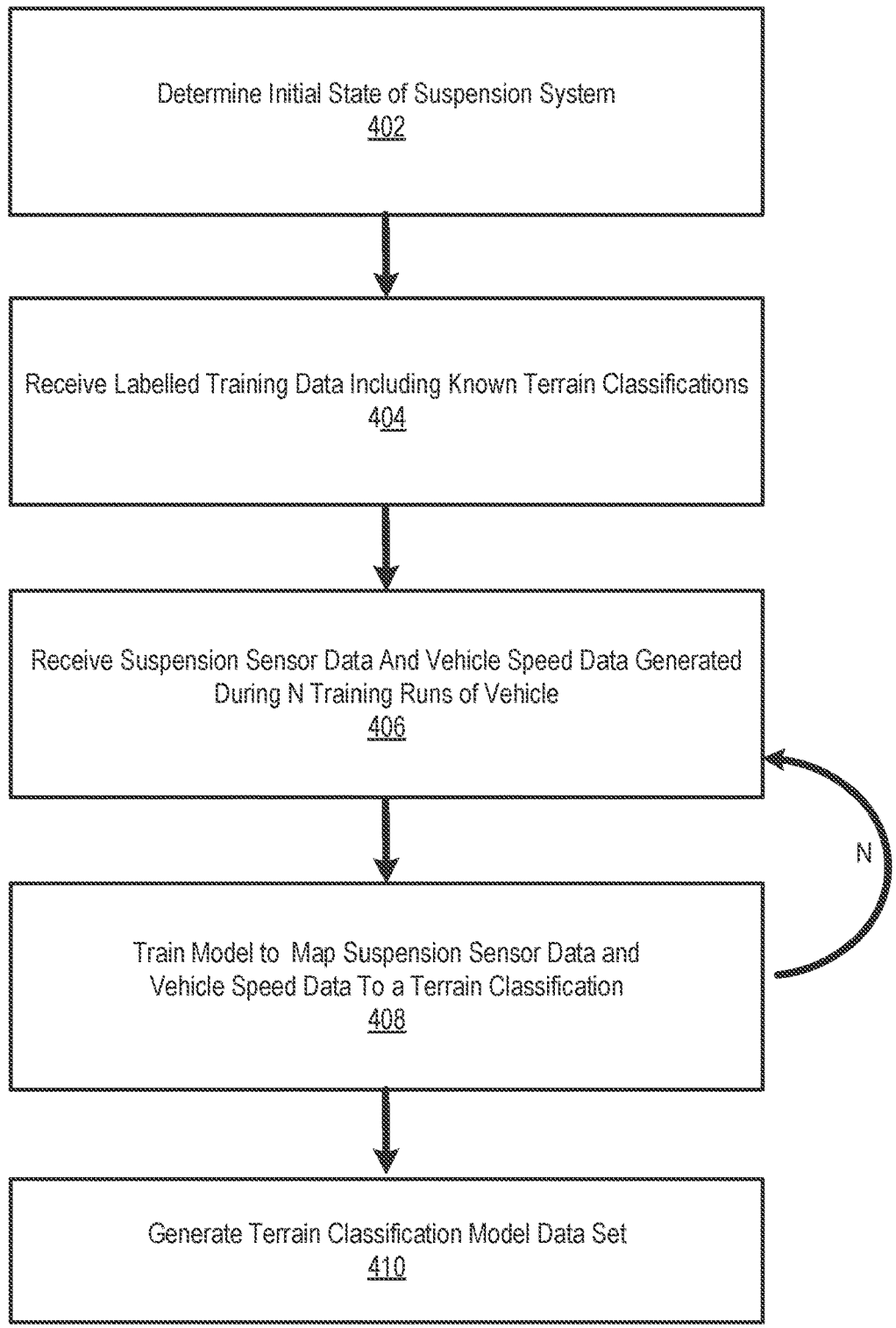
FIG. 4 illustrates a flowchart of terrain classification training operations according to an embodiment of the present disclosure.

FIG. 4 illustrates a flowchart 400 of terrain classification training operations according to an embodiment of the present disclosure. Operations of this embodiment include determining an initial state of a suspension system of a vehicle 402. The initial state may include, for example, a new suspension system, a suspension system having 1000 terrain miles associated with it, etc. Operations of this embodiment also include receiving labelled training data that includes a plurality of known terrain classifications 404. Operations of this embodiment also include receiving suspension sensor data and vehicle speed data generated during N number of training runs of the vehicle 406. Operations of this embodiment also include mapping suspension sensor data and vehicle speed data to a terrain classification of the labelled training data 408. Operations of this embodiment may also include repeating operations 406 and 408 for N number of training runs of the vehicle operating on a plurality of known terrains. Operations of this embodiment also includes generating a terrain classification trained model that correlates terrain classifications to ranges of suspension sensor data and vehicle speed data 410.

Figure 5:
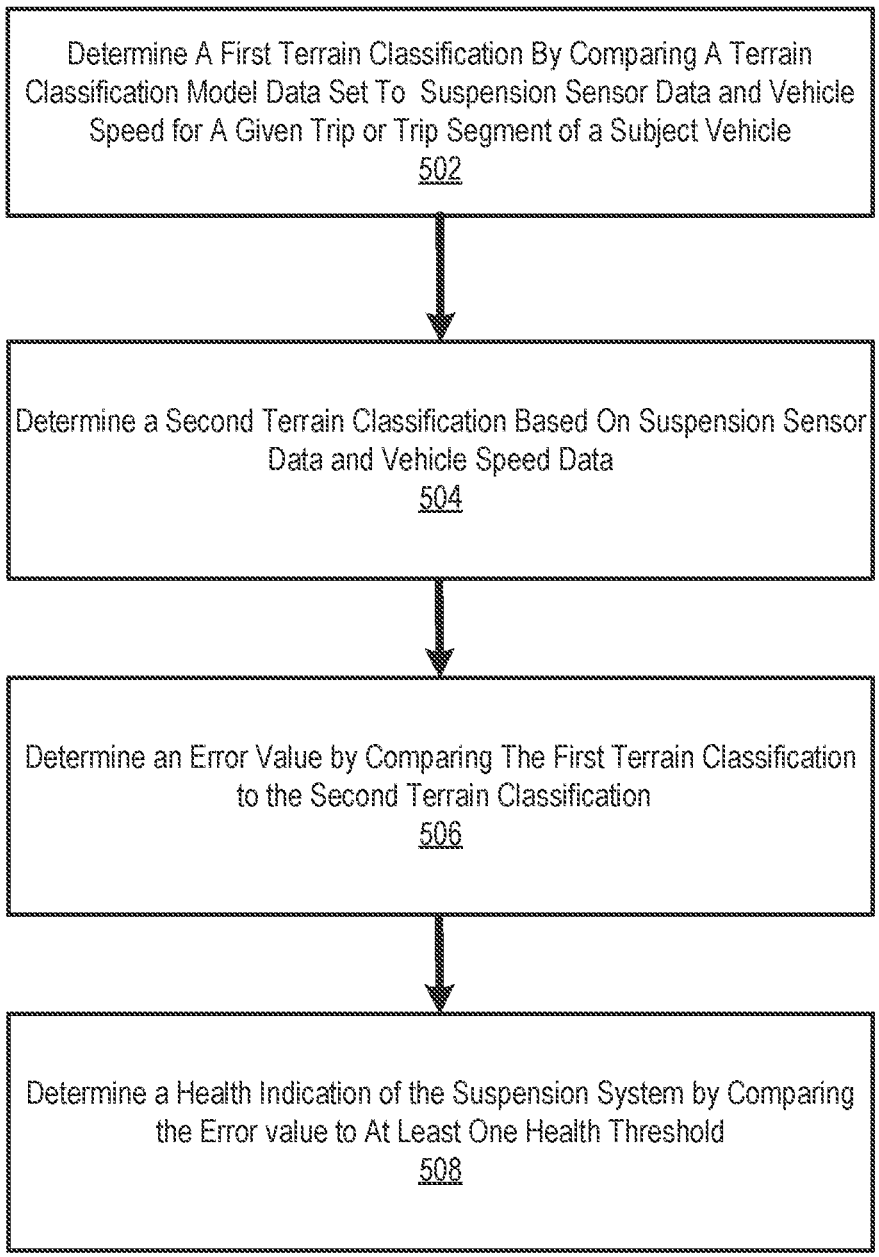
FIG. 5 illustrates a flowchart of terrain classification and sub-system health determination operations according to an embodiment of the present disclosure.

FIG. 5 illustrates a flowchart 500 of terrain classification and sub-system health determination operations according to an embodiment of the present disclosure. Operations of this embodiment include determining a first terrain classification by comparing a terrain classification trained model to suspension sensor data and vehicle speed data for a given trip or trip segment of a subject vehicle 502. Operations of this embodiment also include determining a second terrain classification based on the suspension sensor data and the vehicle speed data, and independent of the terrain classification model data set 504. Operations of this embodiment also include determining an error value by comparing the first terrain classification to the second terrain classification 506. Determine a health indication of the suspension system of the vehicle by comparing the error value to at least one health threshold 508.

While FIGS. 4-5 illustrate various operations according to one or more embodiments, it is to be understood that not all of the operations depicted in FIGS. 4-5 are necessary for other embodiments. Indeed, it is fully contemplated herein that in other embodiments of the present disclosure, the operations depicted in FIG. 4-5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As described herein, the data being collected and stored may be used to implement service and maintenance recommendations and track issues in fielded vehicles. This data can be used in vehicle replacement decisions using a metric-based assessment of vehicle health enabling a more data-driven decision about whether to consider replacing a vehicle. Once a significant data set is captured and analyzed, it can be used to evaluate the accuracy of the spare parts kit, supporting documentation, component solutions, and evolution of the Performance Specification (PSpec).

Accordingly, one embodiment provides a system for terrain classification and vehicle suspension sub-system health status indication, comprising: run-time terrain classification circuitry to determine a first terrain classification, for a vehicle travelling on a terrain segment, based on comparing a trained model to suspension sub-system sensor data and vehicle speed data; model accuracy determination circuitry to determine a second terrain classification, for the vehicle travelling on the terrain segment, based on the suspension sub-system sensor data and vehicle speed data and independent of the trained model; and sub-system health determination circuitry to determine a health indication of the suspension sub-system by comparing a difference between the first and second terrain classifications to at least one health threshold.

Another embodiment provides a non-transitory storage device that includes machine-readable instructions that, when executed by one or more processors, cause the one or more processors to perform operations, comprising: determine a first terrain classification, for a vehicle travelling on a terrain segment, based on comparing a trained model to suspension sub-system sensor data and vehicle speed data; determine a second terrain classification, for the vehicle travelling on the terrain segment, based on the suspension sub-system sensor data and vehicle speed data and independent of the trained model; and determine a health indication of the suspension sub-system by comparing a difference between the first and second terrain classifications to at least one health threshold.

Still another embodiment provides a method for terrain classification and vehicle suspension sub-system health status indication, comprising: determining a first terrain classification, for a vehicle travelling on a terrain segment, based on comparing a trained model to suspension sub-system sensor data and vehicle speed data; determining a second terrain classification, for the vehicle travelling on the terrain segment, based on the suspension sub-system sensor data and vehicle speed data and independent of the model data set; and determining a health indication of the suspension sub-system by comparing a difference between the first and second terrain classifications to at least one health threshold.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" may refer to, for example, software, firmware and/or circuitry configured to perform any of the aforementioned operations. Software may be embodied as a software package, code, instructions, instruction sets and/or data recorded on non-transitory, computer-readable storage devices. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD). digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored therein, individually or in combination, instructions that when executed by circuitry perform the operations. Here, the circuitry may include any of the aforementioned circuitry including, for examples, one or more processors, ASICs, ICs, etc., and/or other programmable circuitry. Also, it is intended that operations described herein may be distributed across a plurality of physical devices, such as processing structures at more than one different physical location. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The terms and expressions which have been employed herein are used as terms of description and not of limitation, and there is no intention, in the use of such terms and expressions, of excluding, any equivalents of the features shown and described or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed is:

1. A system for terrain classification and vehicle suspension sub-system health status indication, comprising:
    run-time terrain classification circuitry to determine a first terrain classification, for a vehicle travelling on a terrain segment, based on comparing a trained model to suspension sub-system sensor data and vehicle speed data;
    model accuracy determination circuitry to determine a second terrain classification, for the vehicle travelling on the terrain segment, based on the suspension sub-system sensor data and vehicle speed data; wherein the run-time terrain classification circuitry being independent of the model accuracy determination circuitry; and wherein the second terrain classification being independent of the first terrain classification;
    comparator circuitry to determine an error value based on comparing the first terrain classification to the second terrain classification; wherein the error value represents an accuracy of the first terrain classification;

sub-system health determination circuitry to determine a health indication of the suspension sub-system by comparing the error value a first health threshold which indicates the start of critical wear of the suspension sub-system and a second health threshold which indicates impending failure of the suspension sub-system; the sub-system health determination circuitry further configured to determine if the run-time terrain classification circuitry is no longer generating an accurate first terrain classification when the error value is greater than the first health threshold or second health threshold; and maximum velocity determination circuitry to determine a maximum velocity value based on the error value and the two health thresholds.

2. The system of claim 1, further comprising terrain classification training circuitry to generate the trained model by mapping the suspension sub-system sensor data and vehicle speed data to labelled training data that includes a plurality of terrain classifications of known terrains and corresponding ranges of suspension sub-system sensor data and vehicle speed data for each terrain classification of known terrains.

3. The system of claim 1, wherein the trained model comprises a plurality of terrain classifications mapped to ranges of suspension sub-system sensor data and vehicle speed data.

4. The system of claim 1, wherein the suspension sub-system sensor data comprises x, y and z-direction acceleration and x, y and z-direction gyroscopic data of the vehicle.

5. The system of claim 1, wherein the run-time terrain classification circuitry comprising multi-nodal neural network circuitry, and wherein a model data set used to generate the trained model, suspension sub-system sensor data and vehicle speed data each being assigned to at least one node of the multi-nodal neural network circuitry.

6. The system of claim 2, wherein the terrain classification training circuitry comprising multi-nodal neural network circuitry, and wherein the labelled training data, suspension sub-system sensor data and vehicle speed data each being assigned to at least one node of the multi-nodal neural network circuitry.

7. A non-transitory storage device that includes machine-readable instructions that, when executed by one or more processors, cause the one or more processors to perform operations, comprising:

determine a first terrain classification, for a vehicle travelling on a terrain segment, based on comparing a trained model to suspension sub-system sensor data and vehicle speed data;

determine a second terrain classification, for the vehicle travelling on the terrain segment, based on the suspension sub-system sensor data and vehicle speed data; wherein the second terrain classification being independent of the first terrain classification;

determine an error value based on comparing the first terrain classification to the second terrain classification; wherein the error value represents an accuracy of the first terrain classification;

determine a health indication of the suspension sub-system by comparing the error value to a first health threshold which indicates the start of critical wear of the suspension sub-system and a second health threshold which indicates impending failure of the suspension sub-system;

determine if the run-time terrain classification circuitry is no longer generating an accurate first terrain classification when the error value is greater than the first health threshold or second health threshold; and determine a maximum velocity value based on the error value and the two health thresholds.

8. The non-transitory storage device of claim 7, wherein the machine-readable instructions that, when executed by one or more processors, cause the one or more processors to perform operations, further comprising:

generate the trained model by mapping the suspension sub-system sensor data and vehicle speed data to labelled training data that includes a plurality of terrain classifications of known terrains and corresponding ranges of suspension sub-system sensor data and vehicle speed data for each terrain classification of known terrains.

9. The non-transitory storage device of claim 8, wherein the trained model comprises a plurality of terrain classifications mapped to ranges of suspension sub-system sensor data and vehicle speed data.

10. The non-transitory storage device of claim 7, wherein the suspension sub-system sensor data comprises x, y and z-direction acceleration and x, y and z-direction gyroscopic data of the vehicle.

11. A method for terrain classification and vehicle suspension sub-system health status indication, comprising:

determining a first terrain classification, for a vehicle travelling on a terrain segment, based on comparing a trained model to suspension sub-system sensor data and vehicle speed data;

determining a second terrain classification, for the vehicle travelling on the terrain segment, based on the suspension sub-system sensor data and vehicle speed data; wherein the second terrain classification being independent of the first terrain classification;

determining an error value based on comparing the first terrain classification to the second terrain classification; wherein the error value represents an accuracy of the first terrain classification;

determining a health indication of the suspension sub-system by comparing the error value a first health threshold which indicates the start of critical wear of the suspension sub-system and a second health threshold which indicates impending failure of the suspension sub-system;

determining if the run-time terrain classification circuitry is no longer generating an accurate first terrain classification when the error value is greater than the first health threshold or second health threshold; and determining a maximum velocity value based on the error value and the at least two health thresholds.

12. The method of claim 11, further comprising:

generating the trained model by mapping the suspension sub-system sensor data and vehicle speed data to labelled training data that includes a plurality of terrain classifications of known terrains and corresponding ranges of suspension sub-system sensor data and vehicle speed data for each terrain classification of known terrains.

13. The method of claim 12, wherein the trained model comprises a plurality of terrain classifications mapped to ranges of suspension sub-system sensor data and vehicle speed data.

14. The method of claim 11, wherein the suspension sub-system sensor data comprises x, y and z-direction acceleration data of the vehicle.

* * * * *